United States Patent Office 3,356,735
Patented Dec. 5, 1967

3,356,735
CHLOROMETHYL ETHER PROCESS
Shigeto Suzuki, San Francisco, Calif., assignor to Chevron Research Company, San Francisco, Calif., a corporation of Delaware
No Drawing. Filed Dec. 27, 1965, Ser. No. 516,693
3 Claims. (Cl. 260—611)

This invention refers to an improved process for the chloromethylation of alcohols. More specifically, it refers to the novel use of lithium chloride as a means of obtaining higher yields of the desired chloromethyl ethers.

The chloromethylation reaction is believed to be summarized by the following equation:

$$R(OH)_n + nHCHO + nHCl \rightarrow R(OCH_2Cl)_n + nH_2O$$

In the ordinary preparation of chloromethyl ethers, formaldehyde is dissolved in the desired alcohol or polyol to be chloromethylated, and dry hydrogen chloride is introduced into the mixture. In general, when the solution has become saturated with hydrogen chloride, the reaction is complete. Reaction temperatures of the order of 20–25° C., i.e., ambient temperatures, are conveniently employed, but higher and lower values may, of course, be used, i.e., moderate temperatures of the order of about 0° C. to 100° C. and somewhat higher. Yields based upon formaldehyde are of the order of 80% when monohydroxy feed compounds are used, and when diols are chloromethylated, the yields are of the order of about 70%.

It has now been found that chloromethylations as described above, wherein R of the general equation is a saturated hydrocarbon radical attached to $n$ hydroxyl groups and $n$ is a whole number less than 5, and wherein the hydroxy feed compound is liquefiable, are substantially improved when said reaction is effected in the presence of an effective amount of lithium chloride, i.e., from about 0.1 to 1.0 mol per mol of the feed compound. The addition of the lithium chloride to the reaction solution improves the yield of the desired chloromethyl ether by at least about 5% and can be as much as 20% and higher.

In a preferred embodiment, a solution of lithium chloride in isopropyl alcohol in the mol ratio 0.25 to 1, respectively, is charged to a suitable corrosion-resistant reaction vessel, for example, a glass reactor fitted for stirring and the introduction of hydrogen chloride. Solid paraformaldehyde in a molar amount substantially equivalent to the isopropanol is also charged to the reaction vessel, and hydrogen chloride is bubbled into the resulting mixture until it becomes saturated therewith. During the course of the reaction the paraformaldehyde appears to dissociate and dissolve in the reaction medium, a reaction ensues and a second liquid layer develops. The upper layer is the desired chloromethyl ether which is produced in about 95% yield.

Representative feed compounds for the process are methanol, ethanol, 2-propanol, 2-methylbutanol, eicosanol, dodecanol, cyclohexanol, cyclooctanol, cyclododecanol, 2-phenyl ethanol, ethylene glycol, 1,4-butanediol, 1,2-propanediol, 1,6-hexanediol, 1,8-octanediol, 1,4-cyclohexanediol, glycerine and pentaerithritol and the like mono- and polyhydroxy compounds. Preferred feed compounds are those of the above general formula in which R is a saturated aliphatic radical having from 1 to about 20 carbon atoms.

The following examples illustrate the process.

*Example 1*

A series of experiments were carried out in the manner described in the preferred embodiment using the feed compounds and with the results indicated in the table following.

TABLE

| Feed Compound | Mol Percent Yield | |
|---|---|---|
| | Prior Art Process | LiCl Catalyzed Process |
| Methanol | 83 | 90 |
| Isopropanol | 83 | 95 |
| Ethylene glycol | 67 | 89 |

*Example 2*

Similarly a series of runs were carried out in which the mol ratio of lithium chloride to the alcohol, 2-propanol, were 0.19, 0.28 and 0.50, respectively. In each case the yield of the desired chloromethyl ether exceeded 90%.

Clearly, modifications and variations of the invention as hereinbefore set forth and exemplified may be made without departing from the sense thereof. Therefore, only such limitations should be imposed as are indicated in the appended claims.

I claim:
1. In a process for the production of a chloromethyl ether by the liquid phase reaction of formaldehyde, hydrogen chloride and a compound of the formula

$$R(OH)_n$$

wherein R is a saturated aliphatic hydrocarbon radical containing less than 21 carbon atoms and $n$ is a whole number less than 5, said reaction being effected by passing hydrogen chloride gas into a mixture consisting essentially of formaldehyde and said compound maintained at a temperature in the range of about 0° C. to 100° C., the improvement which comprises dissolving lithium chloride in said reaction mixture in an amount in the range from about 0.1 to 1 mol per mol of said compound, thereby increasing the yield of the corresponding chloromethyl ether by at least about 5 percent.

2. The process of claim 1 wherein one hydrogen atom of said aliphatic hydrocarbon radical is replaced by a phenyl group.

3. The process of claim 1 wherein for each mol of said compound in said reaction mixture there is a substantially stoichiometric amount of formaldehyde.

References Cited

UNITED STATES PATENTS

| 2,290,462 | 7/1942 | Allen et al. | 260—615 |
| 2,304,431 | 12/1942 | Walker. | |
| 2,652,432 | 9/1953 | Bauman et al. | 260—614 |
| 2,667,516 | 1/1954 | Bauman et al. | 260—614 |

OTHER REFERENCES

Walker, Formaldehyde, Reinhold Publishing Corp., N.Y. (1964), pp. 277–278.

LEON ZITVER, *Primary Examiner.*

H. T. MARS, *Assistant Examiner.*